US012738195B2

(12) United States Patent
Lee et al.

(10) Patent No.: US 12,738,195 B2

(45) Date of Patent: Sep. 15, 2026

(54) MICRO LED DRIVING CIRCUIT COMPRISING DOUBLE GATE TRANSISTOR AND MICRO LED DISPLAY DEVICE COMPRISING THEREOF

(71) Applicant: SEOUL NATIONAL UNIVERSITY R&DB FOUNDATION, Seoul (KR)

(72) Inventors: Soo Yeon Lee, Seoul (KR); Ji Min Kang, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 18/574,597

(22) PCT Filed: Jul. 18, 2023

(86) PCT No.: PCT/KR2023/010336

§ 371 (c)(1),
(2) Date: Dec. 27, 2023

(87) PCT Pub. No.: WO2024/019497

PCT Pub. Date: Jan. 25, 2024

(65) Prior Publication Data

US 2025/0078730 A1 Mar. 6, 2025

(30) Foreign Application Priority Data

Jul. 18, 2022 (KR) ........................ 10-2022-0088147

(51) Int. Cl.
*G09G 3/32* (2016.01)
*G09G 3/20* (2006.01)
(Continued)

(52) U.S. Cl.
CPC ............. *G09G 3/32* (2013.01); *G09G 3/2014* (2013.01); *G09G 3/2018* (2013.01); *G09G 3/30* (2013.01);
(Continued)

(58) Field of Classification Search
CPC ...... G09G 3/2018; G09G 3/32; G09G 3/3208; G09G 3/3225; G09G 3/3233;
(Continued)

(56) References Cited

U.S. PATENT DOCUMENTS

| | | | | |
|---|---|---|---|---|
| 11,222,583 | B2 * | 1/2022 | Takahashi | G09G 3/2014 |
| 12,183,261 | B2 * | 12/2024 | Baumheinrich | G09G 3/32 |

(Continued)

FOREIGN PATENT DOCUMENTS

| | | | |
|---|---|---|---|
| KR | 10-2016-0018892 | A | 2/2016 |
| KR | 10-2021-0086331 | A | 7/2021 |
| KR | 10-2362145 | B1 | 2/2022 |

OTHER PUBLICATIONS

Taesoo Kim et al., "Design of Pixel Circuit of Micro LED Display with Double Gate Thin Film Transistors", Journal of the Semiconductor & Display Technology, Mar. 1, 2022, pp. 50-55, vol. 21, No. 1.

(Continued)

*Primary Examiner* — Jason M Mandeville
(74) *Attorney, Agent, or Firm* — Sughrue Mion, PLLC

(57) ABSTRACT

The present invention relates to a micro LED driving circuit including a double gate transistor, and includes a PWM circuitry for controlling the emission time of the micro LED; and a CCG circuitry that controls a constant current to be supplied while the micro LED emits light based on the PWM data voltage.

9 Claims, 12 Drawing Sheets

(51) Int. Cl.
*G09G 3/30* (2006.01)
*G09G 3/3208* (2016.01)
*G09G 3/3225* (2016.01)
*G09G 3/3233* (2016.01)
*G09G 3/34* (2006.01)
*H05B 45/325* (2020.01)

(52) U.S. Cl.
CPC ......... *G09G 3/3208* (2013.01); *G09G 3/3225* (2013.01); *G09G 3/3233* (2013.01); *G09G 3/34* (2013.01); *H05B 45/325* (2020.01); *G09G 2300/0852* (2013.01); *G09G 2320/0233* (2013.01); *G09G 2320/0242* (2013.01)

(58) Field of Classification Search
CPC ... G09G 2300/0852; G09G 2320/0233; G09G 2320/0242; G09G 3/2014; G09G 3/30; G09G 3/34; H05B 45/325
USPC .................................................... 345/212, 76
See application file for complete search history.

(56) References Cited

U.S. PATENT DOCUMENTS

| | | | | |
|---|---|---|---|---|
| 2021/0366368 | A1* | 11/2021 | Watanabe .............. | H10D 86/60 |
| 2022/0220313 | A1 | 7/2022 | Ikeda et al. | |
| 2022/0225481 | A1* | 7/2022 | Jung ...................... | H05B 45/24 |

OTHER PUBLICATIONS

International Search Report for PCT/KR2023/010336, dated Oct. 20, 2023.

* cited by examiner

【FIG. 1】
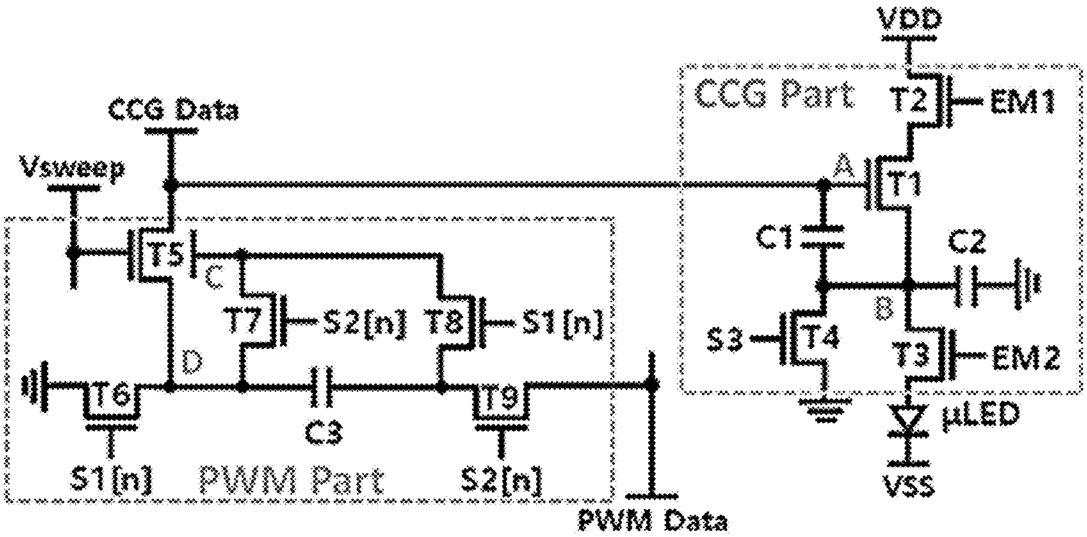

【FIG. 2】
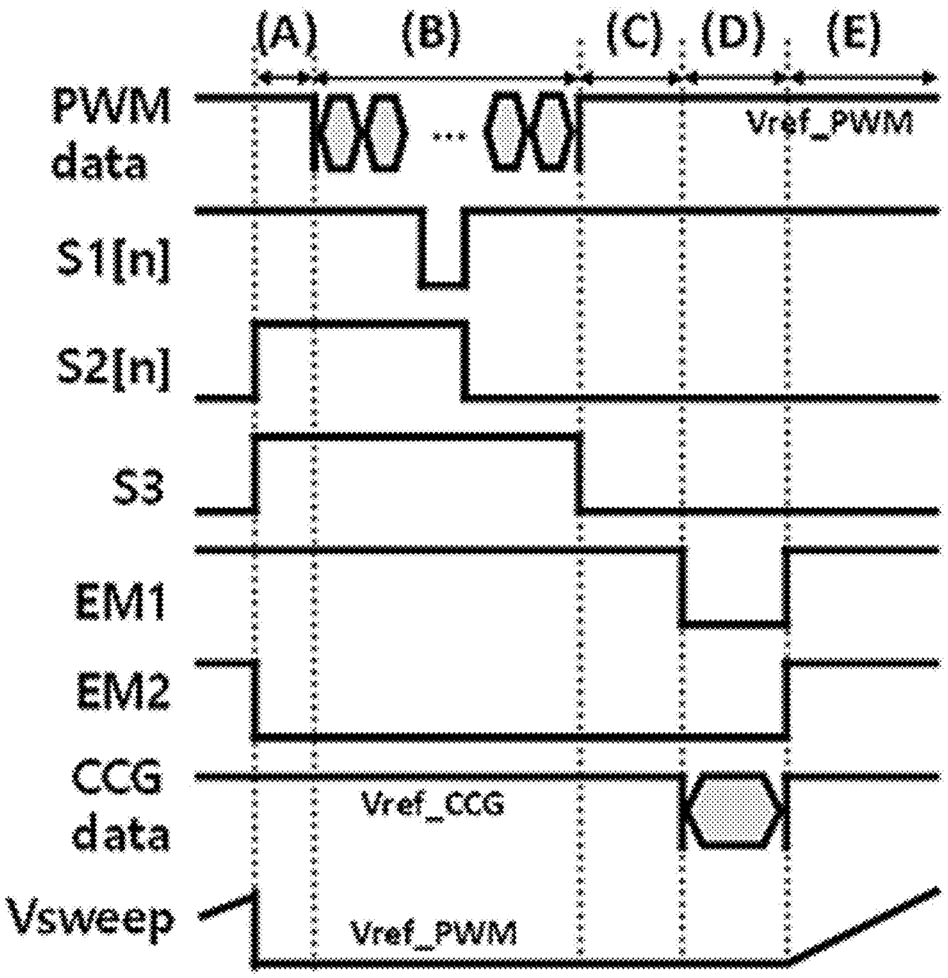

【FIG. 3】
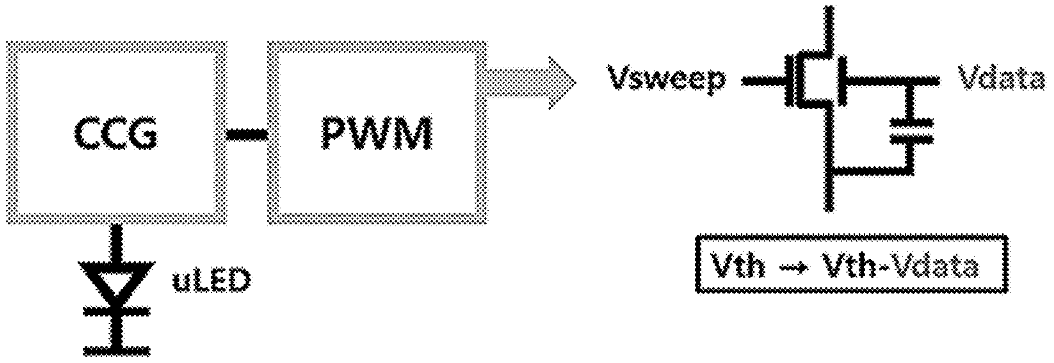

【FIG. 4】
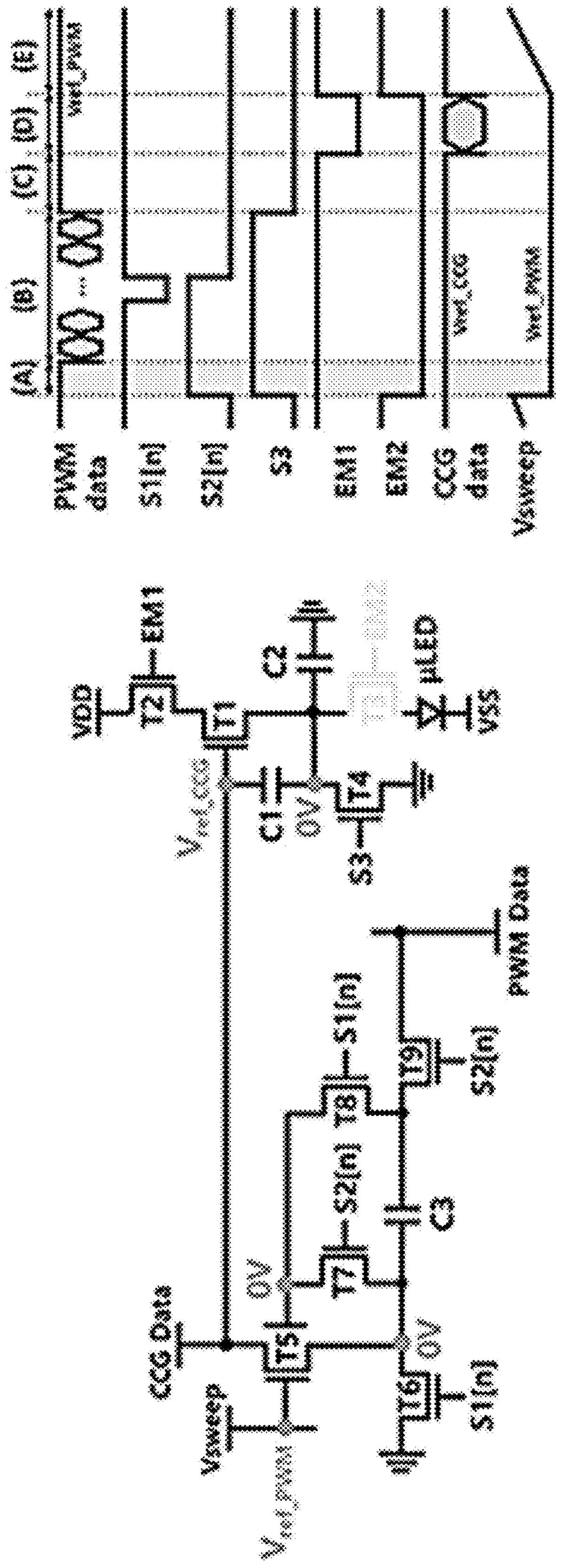

【FIG. 5】
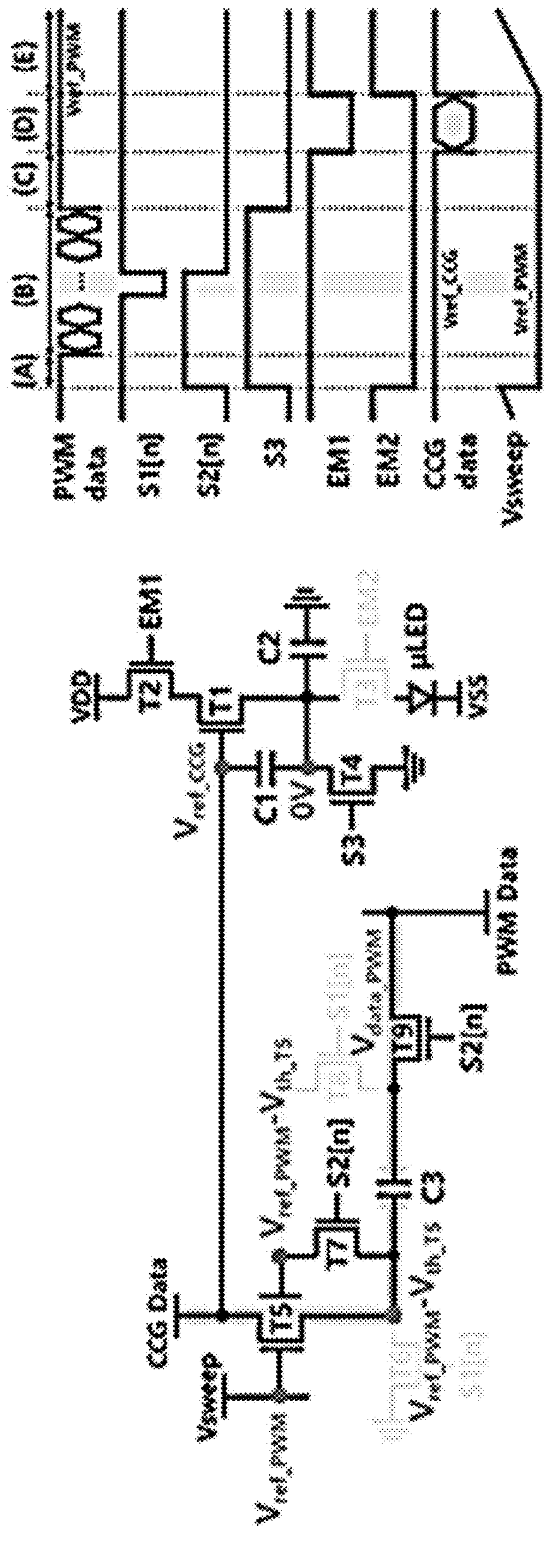

【FIG. 6】
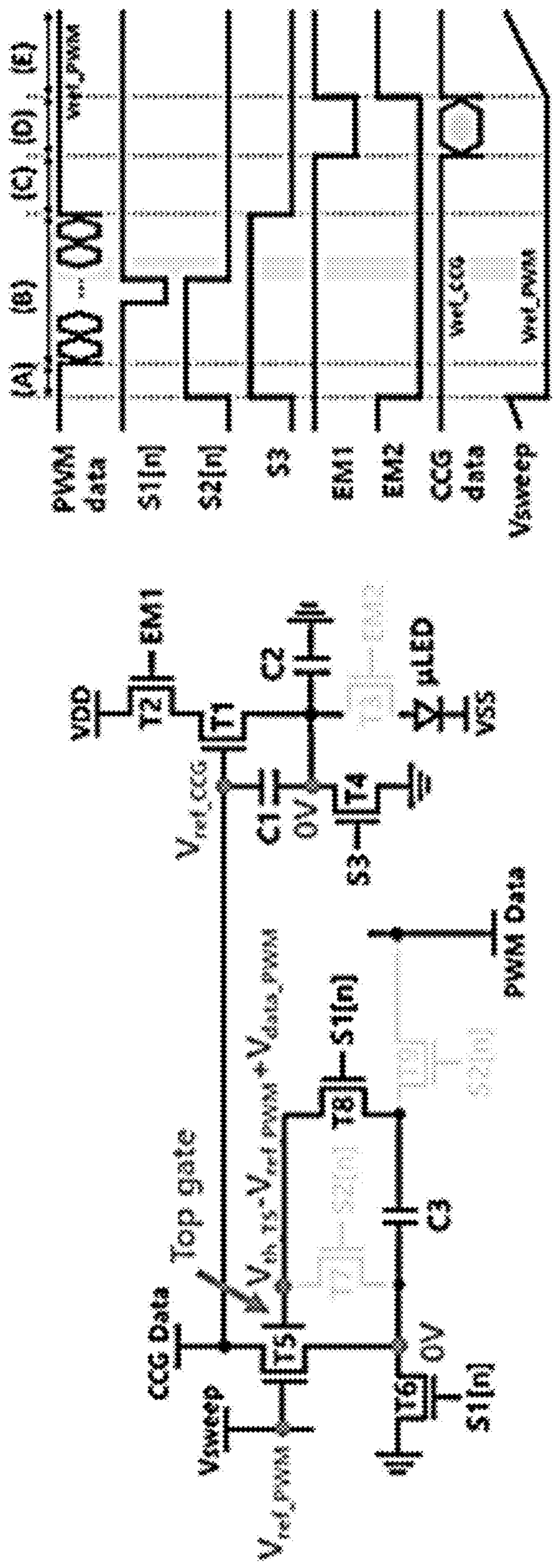

【FIG. 7】
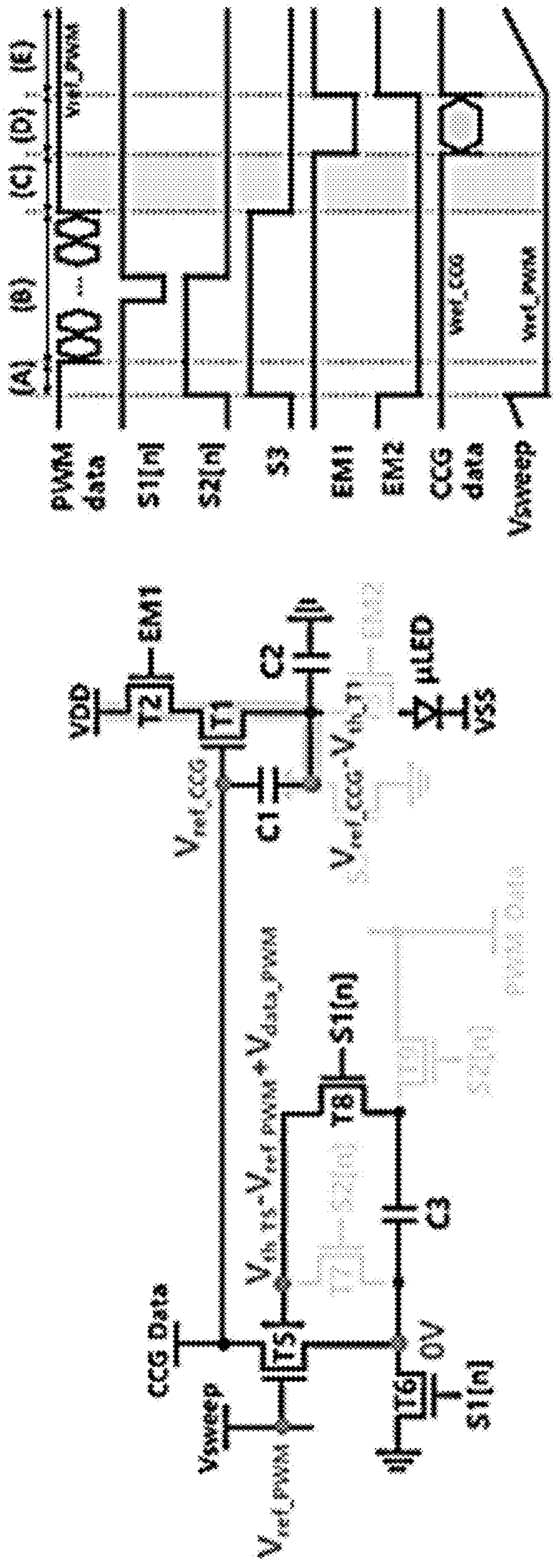

【FIG. 8】
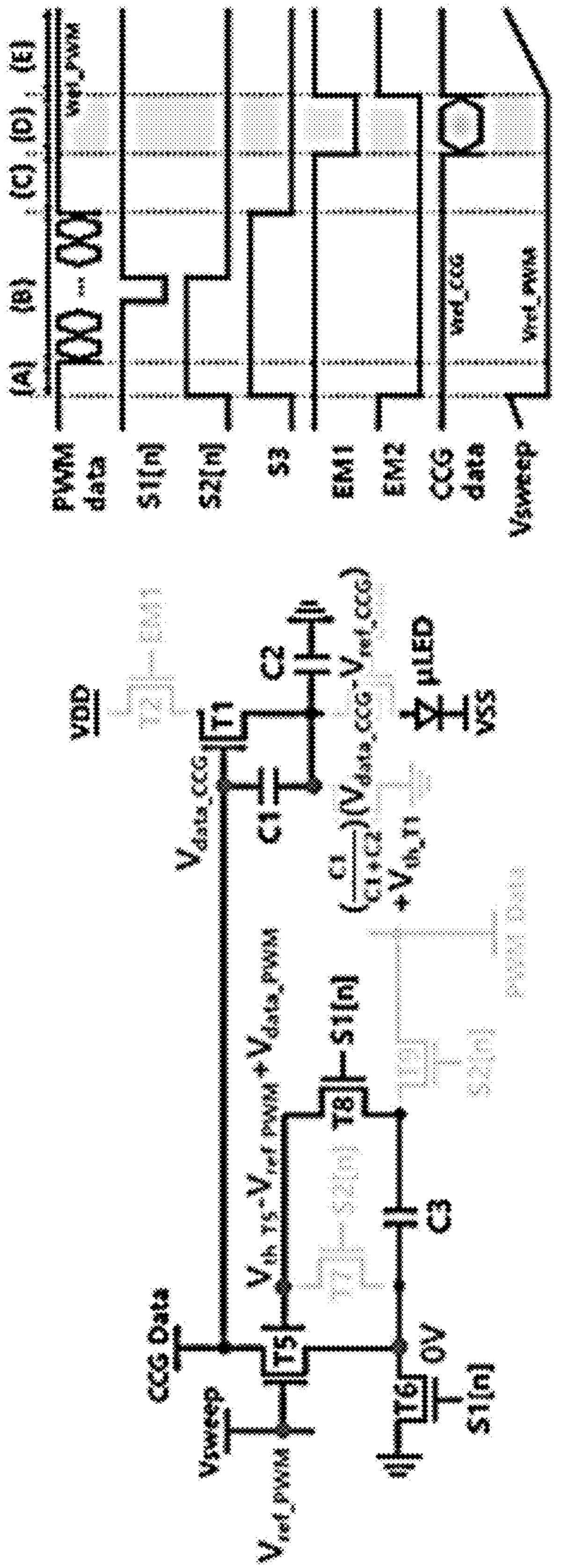

【FIG. 9】
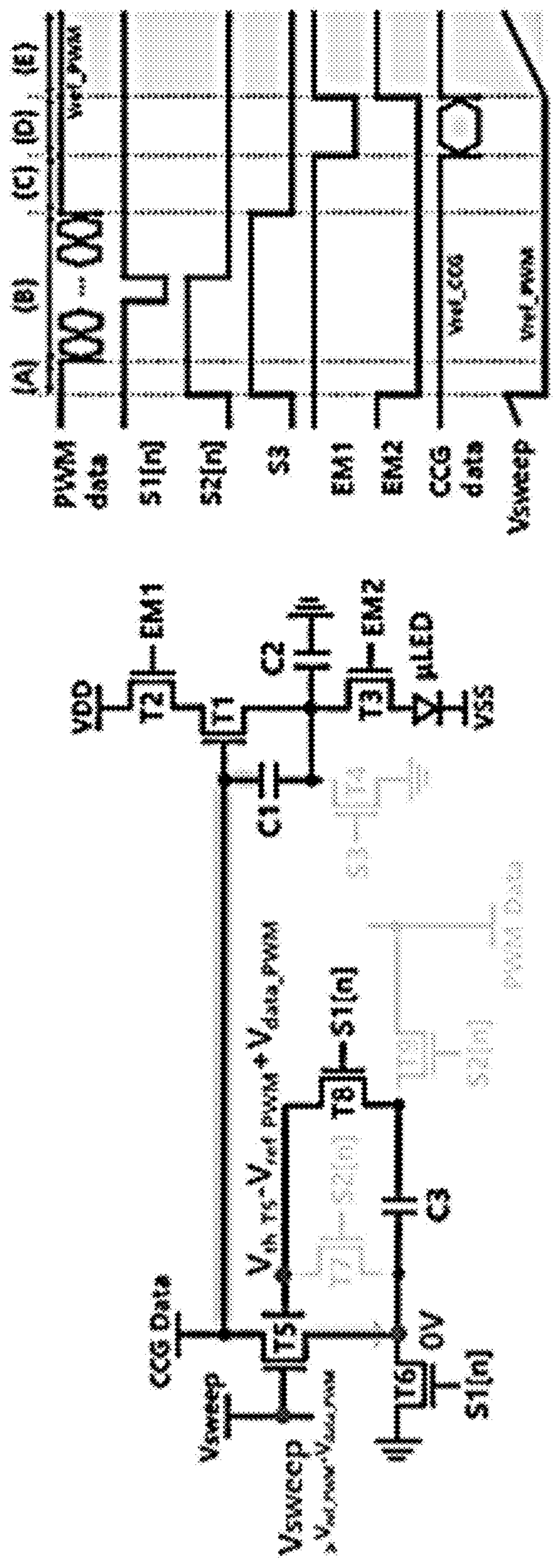

【FIG. 10】
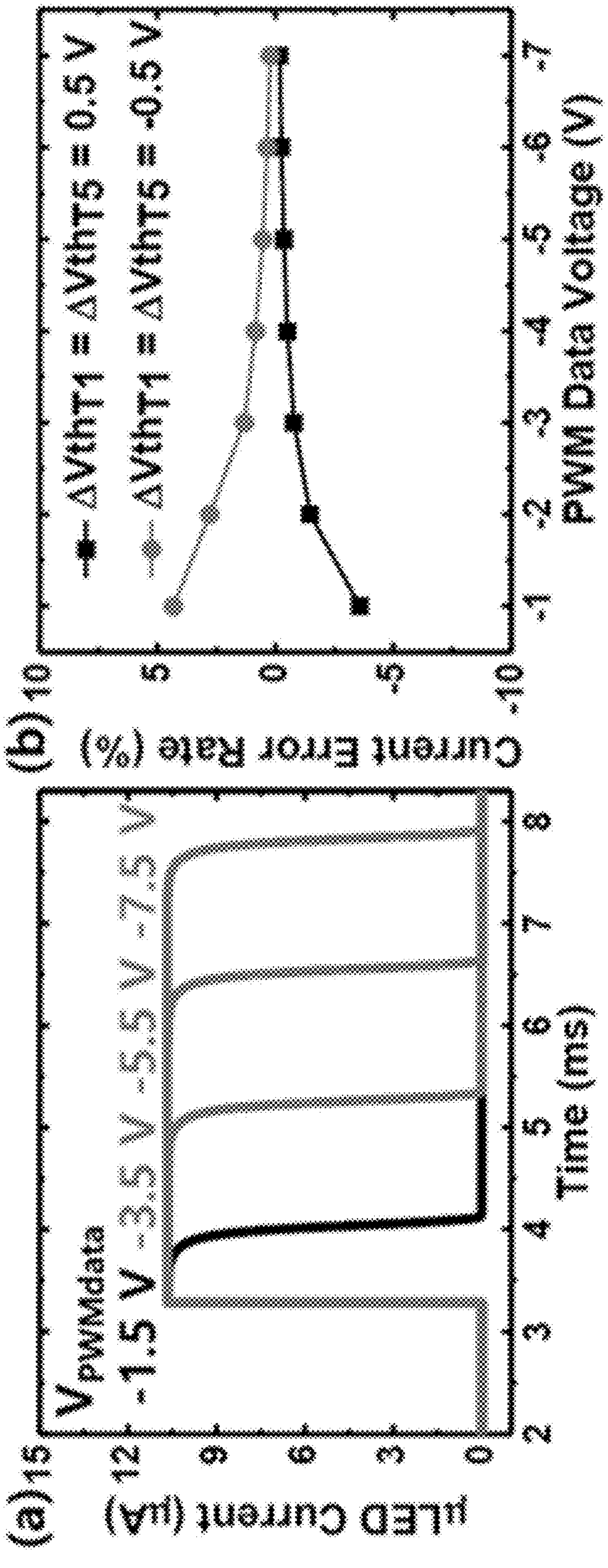

【FIG. 11】
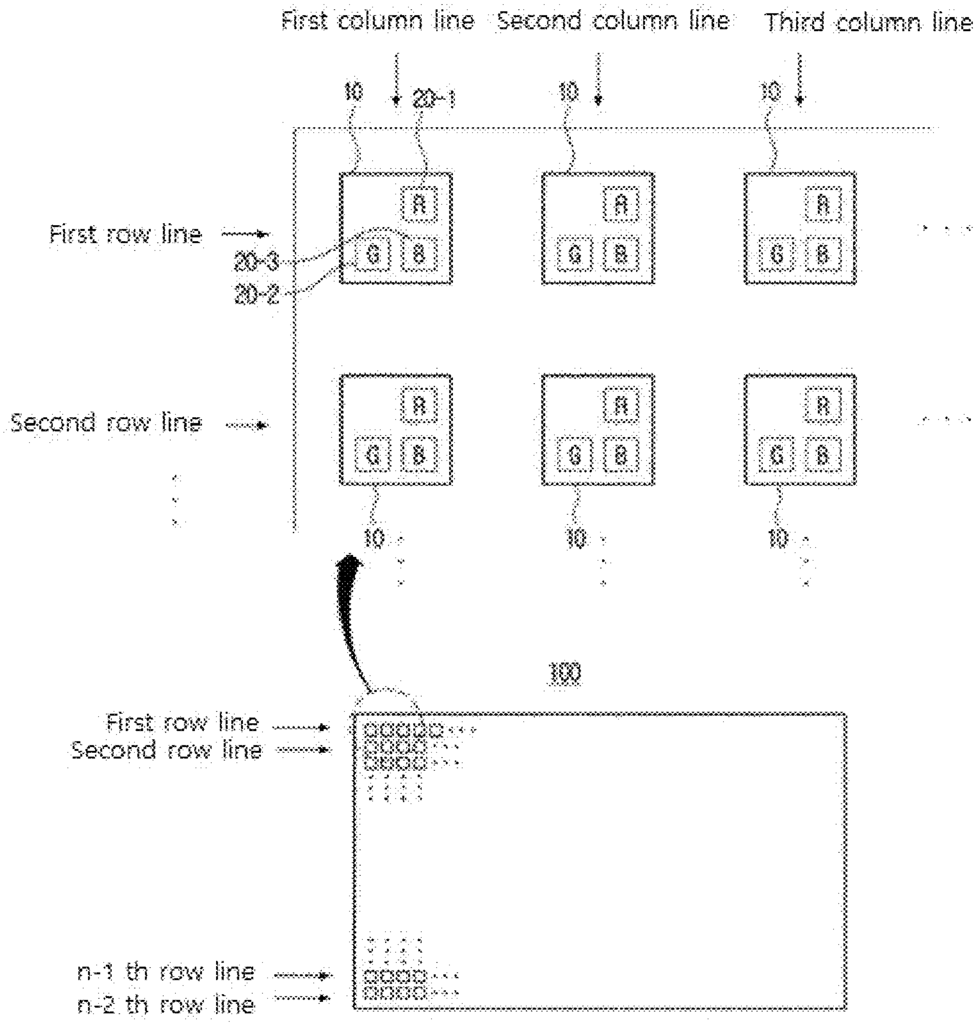

【FIG. 12】
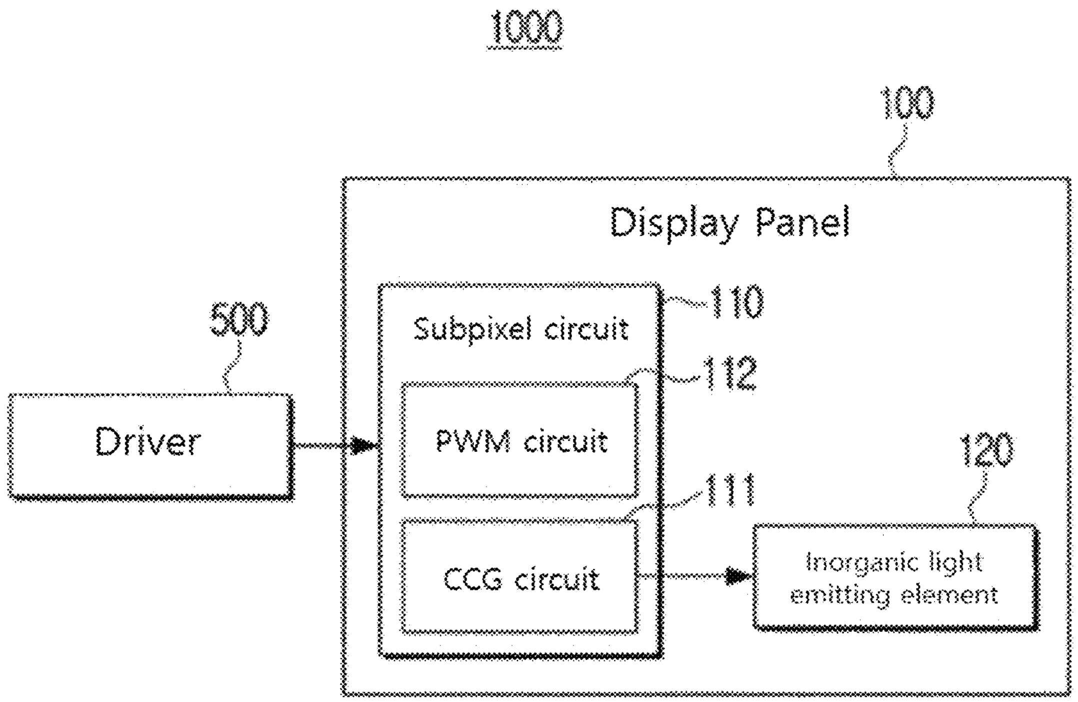

MICRO LED DRIVING CIRCUIT COMPRISING DOUBLE GATE TRANSISTOR AND MICRO LED DISPLAY DEVICE COMPRISING THEREOF

CROSS REFERENCE TO RELATED APPLICATIONS

This application is a National Stage of International Application No. PCT/KR2023/010336 filed Jul. 18, 2023, claiming priority based on Korean Patent Application No. 10-2022-0088147 filed Jul. 18, 2022 and Korean Patent Application No. 10-2023-0093117 filed Jul. 18, 2023, the entire disclosures of which are incorporated herein by reference.

TECHNICAL FIELD

The present disclosure relates to a display device, and more specifically, relates to a micro LED display device comprising a pixel array made of self-emissive elements and a driving circuit comprised therein.

BACKGROUND ART

Conventionally, in a display panel driving inorganic light emitting elements such as red LED (Light Emitting Diode), green LED, and blue LED (hereinafter, LED refers to an inorganic light emitting element.) as subpixels, gradation of subpixels was expressed by a PAM (Pulse Amplitude Modulation) driving method.

In this case, according to the magnitude of the driving current, as not only gradation of emitted light but also the wavelength are changed, color reproducibility of an image is reduced. Such reduction of color reproducibility remarkably occurs particularly in a micro LED.

A general micro LED refers to an ultra-small LED with 100 μm or less, and has advantages of being small in size and consuming less electric power, thereby realizing low power consumption, miniaturization and lightweighting and the like of displays. In addition, unlike organic light emitting diodes (OLED) showing weak points in terms of light emitting efficiency and life and the like, it has excellent efficiency and lift and can operate even in an extreme situation of 20 degrees below zero or less and 100 degrees or higher. Due to this potential as a next-generation display, many domestic and foreign companies are currently strengthening their technology investments for the micro LED.

A micro LED driving circuit is a circuit to implement pixels and gradation of micro LEDs arranged in a matrix form, used for image expression through a scan signal and a data voltage. In general, one pixel driving circuit is used to drive one pixel.

A conventional OLED-based driving circuit used a PAM (Pulse Amplitude Modulation) driving method which expresses gradation with the amount of current flowing through the OLED, when gradation is expressed. When the PAM method is used, grayscale is expressed by adjusting the current value, and then, the amount of current flowing through the OLED is controlled through a driving transistor (Driving TFT) of a driving circuit.

However, the micro LED has the characteristic that the wavelength changes depending on the amount of current, so there was a problem in that the driving by the PAM method is difficult as when gradation is expressed by the PAM driving method, a wavelength shift occurs, and the color changes during a pixel driving process, causing a screen distortion phenomenon.

In particular, in case of a method of implementing a large display by connecting a plurality of modular type micro LED display panels, there was a problem in that the problem in gradation expression is further caused as a difference in color wavelength occurred for each modular.

Therefore, development of a driving method of a self-emissive display panel capable of improving color reproducibility is required. Then, power consumption, luminance uniformity, horizontal crosstalk problems and the like also need to be considered.

DISCLOSURE

Technical Problem

The present invention is to solve problems of the aforementioned prior art, and an object of the present disclosure is to improve problems occurring when a circuit in a PAM driving method in a micro LED display device and provides a micro LED display device with improved color reproducibility.

Another object of the present disclosure is to provide a micro LED display device which can implement gradation expression of a display by fixing the amount of current and controlling the light emitting time, differently from the PAM driving method expressing gradation through the amount of current.

Other object of the present disclosure, is to provide a micro LED display device providing improved color reproducibility for an input image signal and a method for driving the same.

Other object of the present disclosure, is to suggest a subpixel circuit capable of driving inorganic light emitting elements more effectively and stably and provide a display device made by comprising thereof and a method for driving the same.

Other object of the present disclosure, is to provide a display device comprising a driving circuit suitable for high-density integration and a method for driving the same, by optimizing the design of various kinds of circuits which drive inorganic light emitting elements.

Other object of the present disclosure, is to provide a display device which can solve a problem of luminance uniformity degradation due to the threshold voltage or mobility deviation of a driving transistor and a method for driving the same.

The technical objects to be achieved in the present invention are not limited to the matters mentioned above, and other technical problems not mentioned can be considered by those skilled in the art to which the present invention pertains from examples of the present invention to be described below.

Technical Solution

In order to achieve the above objects, the micro LED driving circuit comprising a double gate transistor according to one example of the present invention, comprises a PWM circuitry adjusting light emitting time of a micro LED; and a CCG circuitry controlling a constant current to be supplied during light emission of the micro LED based on the PWM data voltage ($V_{data\_PWM}$).

According to one example, the PMW circuitry may comprise a PWM circuitry driving transistor having a double gate structure, and the on/off timing of the PWM circuitry driving transistor (T5) may be determined through comparison of the PWM data voltage ($V_{data\_PWM}$) and sweep voltage ($V_{sweep}$), and the CCG circuitry may comprise a CCG circuitry driving transistor (T1) controlling time provided to the micro LED based on the PWM data voltage.

According to one example, the PWM circuitry may further comprise a total of 4 PWM circuitry switching transistors and 1 capacitor, and the CCG circuitry may further comprise a total of 3 switching transistors and 2 capacitors.

According to one example, one of the switching transistors of the CCG circuitry may be a switching transistor (T3) directly connected to the micro LED to prevent a current from flowing into the micro LED before operation of the driving circuit.

According to one example, the PWM circuitry and CCG circuitry may each comprise a plurality of switching TFTs.

According to one example, the driving voltage (VDD) may be connected only to the CCG circuitry and supplied to the driving circuit, without a line connected to the PWM circuitry.

According to one example, a line in which the CCG data voltage ($V_{data\_CCG}$) is branched and supplied to the PWM circuitry and the CCG circuitry, respectively, may be comprised.

According to one example, the driving circuit may operate by being divided in a total of 5 steps of: a first step in which a current of the micro LED is blocked; a second step in which PWM data application and compensation are performed; a third step in which compensation in the CCG circuitry is achieved after PWM data application to the PWM circuitry and CCG circuitry is completed; a fourth step in which the CCG data voltage is applied to the CCG circuitry and capacitive coupling is caused by at least two capacitors; and a fifth step in which the micro LED emits light while a current flows to the CCG circuitry driving transistor (T1).

According to one example, the switching transistor (T3) directly connected to the micro LED may be turned off to block the current of the micro LED in the first step, and the voltage may be stored in the capacitor connected to the two data voltages as the CCG data voltage and PWM data voltage may be applied to the PWM circuitry in the second step.

According to one example, the voltage may increase slowly as a $V_{sweep}$ signal in a triangle wave form is applied, and as the driving transistor of the PWM circuit is turned on, a first capacitor (C1) comprised in the CCG circuit may be discharged and light emission of the micro LED can be stopped, in the fifth step.

The micro LED display device comprising a double gate transistor according to another example of the present invention, in the display device comprising a micro LED driving circuit, may comprise a display panel comprising a pixel array in which pixels composed of a plurality of inorganic light emitting elements are arranged in a plurality of row lines, and a subpixel circuit which is prepared for each of the plurality of inorganic light emitting elements, and provides a driving current to the inorganic light emitting elements; and a driver which sets an image data voltage to the subpixel circuits of the display panel in row line order, during the data setting period, and drives the subpixel circuits so that the driving current is provided to the inorganic light emitting elements of the pixel array in row line order, based on a sweep signal ($V_{sweep}$) which sweeps from a first voltage to a second voltage and the set image data voltage, during the light emission period, and the subpixel circuits, may comprise a PWM circuitry controlling light emitting time of a micro LED; and a CCG circuitry controlling a constant current to flow during light emission of the micro LED.

According to one example, the subpixel circuits may comprise the micro LED driving circuit according to one example of the present invention.

Advantageous Effects

When the driving circuit suggested in the present invention is used, in a micro LED display device, not only the light emitting time of a micro LED can be effectively adjusted, but also threshold voltage compensation of a driving transistor can be effectively achieved.

BRIEF DESCRIPTION OF THE DRAWINGS

FIG. 1 is a detailed circuit diagram of the micro LED driving circuit comprising a double gate transistor according to one example of the present invention.

FIG. 2, is a signal flow chart of the micro LED driving circuit comprising a double gate transistor according to one example of the present invention.

FIG. 3, is an informal schematic diagram of the micro LED driving circuit comprising a double gate transistor according to one example of the present invention, and is a circuit diagram showing the structure of the double gate transistor comprised in the PWM circuit.

FIG. 4, is a diagram illustrating the operation principle in the first step (Reset step) of the micro LED driving circuit comprising a double gate transistor according to one example of the present invention.

FIG. 5, is a diagram illustrating the operation principle at the beginning in the second step (PWM Data Input & Compensation) of the micro LED driving circuit comprising a double gate transistor according to one example of the present invention.

FIG. 6, is a diagram illustrating the operation principle at the late period in the second step (PWM Data Input & Compensation) of the micro LED driving circuit comprising a double gate transistor according to one example of the present invention.

FIG. 7, is a diagram illustrating the operation principle in the third step (CCG Part Compensation) of the micro LED driving circuit comprising a double gate transistor according to one example of the present invention.

FIG. 8, is a diagram illustrating the operation principle in the fourth step (CCG Part Data input) of the micro LED driving circuit comprising a double gate transistor according to one example of the present invention.

FIG. 9, is a diagram illustrating the operation principle in the fifth step (Emission) of the micro LED driving circuit comprising a double gate transistor according to one example of the present invention.

FIG. 10 are (a) the simulation result showing that the light emitting time of the LED can be adjusted according to $V_{data\_PWM}$, and (b) a graph showing that the threshold voltage compensation can be effectively achieved through the CCG circuitry driving transistor (T1) and PWM circuitry driving transistor (T5), of the micro LED driving circuit comprising a double gate transistor according to one example of the present invention.

FIG. 11, is a schematic diagram showing one example of the pixel structure of the micro LED display device equipped with a driving circuit comprising a double gate transistor according to one example of the present invention.

FIG. 12, is a block diagram showing the configuration of the micro LED display device equipped with a driving circuit comprising a double gate transistor according to one example of the present invention.

MODE FOR INVENTION

Hereinafter, the examples of the present invention will be described in detail with reference to the accompanying drawings. In adding reference numerals to elements of each drawing, it should be noted that the same elements have the same numerals as much as possible even if they are indicated on different drawings. In addition, in describing the examples of the present invention, when it is determined that a detailed description of related known composition or functions hinders understanding of the examples of the present invention, the detailed description will be omitted.

Hereinafter, referring to FIG. 1 to FIG. 9, the micro LED driving circuit comprising a double gate transistor suggested in one example of the present invention and the operation method thereof will be described in detail. In FIG. 1 to FIG. 9, one circuit diagram is presented, but this is only one example, and the technical spirit of the present invention is not necessarily limited thereto.

FIG. 1 is a detailed circuit diagram of the micro LED driving circuit comprising a double gate transistor according to one example of the present invention.

FIG. 2, is a signal flow chart of the micro LED driving circuit comprising a double gate transistor according to one example of the present invention.

The micro LED driving circuit comprising a double gate transistor suggested in the present invention, is characterized by using a PWM (Pulse Width Modulation) method expressing grayscale by fixing the current value and adjusting the light emitting time.

The driving circuit, comprises the configuration in which a PWM (Pulse Width Modulation) circuitry and a CCG (Constant Current Generation) circuitry are combined, and specifically, the PWM circuitry plays a role of adjusting the light emitting time of the micro LED and the CCG circuitry plays a role of allowing a constant current to flow during light emission of the micro LED.

The PWM circuitry may determine the on/off timing of the PWM driving transistor through comparison between the data voltage ($V_{data}$) and sweep voltage ($V_{sweep}$). In addition, the PWM circuitry may also perform a role of compensating the threshold voltage of the PWM circuitry driving TFT.

The CCG circuitry may also perform a role of compensating the threshold voltage of the CCG circuitry driving TFT as well.

FIG. 3, is an informal schematic diagram of the micro LED driving circuit comprising a double gate transistor according to one example of the present invention, and is a circuit diagram showing the structure of the double gate transistor comprised in the PWM circuit.

One of the important characteristics of the circuit suggested in the present invention is that a double gate transistor is comprised in the PWM circuitry.

According to one example, the double gate transistor may preferably use a double gate thin film transistor (TFT). The double gate transistor may have a characteristic in that the threshold voltage changes by the data voltage (second gate voltage). The threshold voltage may play a role of determining on/off of an element.

The PWM circuitry may determine the on/off timing of the light emitting element (micro LED) by adjusting the data voltage of the double gate transistor comprised inside.

Hereinafter, the operation principle of each step will be described in detail by the signal diagram of the micro LED driving circuit.

FIG. 4, is a diagram illustrating the operation principle in the first step (Reset step) of the micro LED driving circuit comprising a double gate transistor according to one example of the present invention.

In the first step, the switching transistor (T3) directly connected to the micro LED comprised in the CCG circuitry is turned off in order to block that all node voltages are reset and a current flows through the micro LED (switched to an off state).

FIG. 5, is a diagram illustrating the operation principle at the beginning in the second step (PWM Data Input & Compensation) of the micro LED driving circuit comprising a double gate transistor according to one example of the present invention.

At the beginning of the second step, the PWM data voltage is sequentially applied to each line. The image of FIG. 5 is a diagram showing the time when the PWM data voltage is applied to the $[n]^{th}$ line.

In the second step, the current flows until the source voltage of the double gate transistor is $V_{ref\_PWM}-V_{th\_T5}$, and the PWM data voltage ($V_{data\_PWM}$) is applied through a switching transistor (T9) present between the capacitor (C3) of the PWM circuitry and the PWM data source.

Through this, at the beginning of the second step, the voltage stored in the capacitor (C3) of the PWM circuitry may be $V_{ref\_PWM}-V_{th\_T5}-V_{data\_PWM}$.

FIG. 6, is a diagram illustrating the operation principle at the late period in the second step (PWM Data Input & Compensation) of the micro LED driving circuit comprising a double gate transistor according to one example of the present invention. At the late period of the second step, the PWM data voltage is sequentially applied to each line.

FIG. 6 illustrates a situation when the PWM data voltage is applied to the $[n+1]^{th}$ line. In a state where the voltage stored in C3 of FIG. 6 is kept constant, the left node of C3 becomes 0V, so the top gate voltage of the double gate transistor (T5) becomes $V_{th\_T5}-V_{ref\_PWM}+V_{data\_PWM}$.

The threshold voltage of the double gate transistor (T5) changes to $V_{th\_T5}-\alpha$ ($V_{th\_T5}-V_{ref\_PWM}+V_{data\_PWM}$) by the Top gate voltage, and at this time, when $\alpha$ is 1, it may become $V_{ref\_PWM}-V_{data\_PWM}$ ($\alpha$ is 1 when the thickness of the Top gate and Bottom gate of T5 are the same).

FIG. 7, is a diagram illustrating the operation principle in the third step (CCG Part Compensation) of the micro LED driving circuit comprising a double gate transistor according to one example of the present invention.

In the third step, CCG part compensation begins after completing PWM data application to all lines.

In a state when the voltage stored in the capacitor (C3) of the PWM circuitry is kept constant, the left node of the capacitor (C3) of the PWM circuitry becomes 0V, so the Top gate voltage of T5 becomes $V_{th\_T5}-V_{ref\_PWM}+V_{data\_PWM}$.

Then, the threshold voltage of the double gate transistor (T5) of the PWM circuitry changes to Vth−$\alpha$ ($V_{th\_T5}-V_{ref\_PWM}+V_{data\_PWM}$) by the Top gate voltage, and at this time, when $\alpha$ is 1, it may become $V_{ref\_PWM}-V_{data\_PWM}$ (a is 1, when the thickness of the Top gate and Bottom gate of T5 are the same).

FIG. 8, is a diagram illustrating the operation principle in the fourth step (CCG Part Data input) of the micro LED driving circuit comprising a double gate transistor according to one example of the present invention.

In the fourth step, as shown in FIG. 8, a step in which the CCG data voltage is applied, and the CCG data voltage is applied to the CCG circuit and the threshold voltage of T1, which is a driving transistor, is compensated may occur. Then, while the voltage is applied, capacitive coupling may occur by two capacitors (C1 and C2). At this time, the voltage stored in the capacitor (C1) where the CCG data voltage of the CCG circuitry is first transmitted may be $(C2/(C1+C2))\ (V_{data\_CCG}-V_{ref\_CCG})+V_{th\_T1}$.

However, in the present invention, the configuration of the afore-mentioned CCG circuitry may be driven by being replaced with a common circuit performing other CCG functions in any amount.

FIG. 9, is a diagram illustrating the operation principle in the fifth step (Emission) of the micro LED driving circuit comprising a double gate transistor according to one example of the present invention.

In the fifth step, a current begins to flow through the CCG circuitry driving transistor (T1) and the micro LED emits light. At this time, as a $V_{sweep}$ signal in a triangle wave form is applied, the voltage increases slowly.

In the fifth step, the driving condition of the double gate transistor (T5) of the PWM circuitry may be $V_{sweep}$>a threshold voltage of T5. In other words, the following condition should be satisfied.

$$V_{sweep} > V_{ref\_PWM} - V_{data\_PWM}$$

In other words, when the $V_{sweep}$ voltage exceeds $V_{ref\_PWM}-V_{data\_PWM}$, the double gate transistor (T5) is turned on, and the voltage stored in the capacitor (C1) in which the CCG data voltage of the CCG circuitry is first transmitted is discharged and the light emission of the LED is stopped.

Then, the driving circuit can adjust the light emitting time of the LED, as the timing when the double gate transistor (T5) of the PWM circuitry is turned on is determined depending on the $V_{data\_PWM}$ value.

FIG. 10 are (a) the simulation result showing that the light emitting time of the LED can be adjusted according to $V_{data\_PWM}$, and (b) a graph showing that the threshold voltage compensation can be effectively achieved through the CCG circuitry driving transistor (T1) and PWM circuitry driving transistor (T5), of the micro LED driving circuit comprising a double gate transistor according to one example of the present invention.

In order to achieve the above objects, the micro LED driving circuit comprising a double gate transistor according to one example of the present invention, comprises a PWM circuitry adjusting light emitting time of a micro LED; and a CCG circuitry controlling a constant current to be supplied during light emission of the micro LED based on the PWM data voltage ($V_{data\_PWM}$).

According to one example, the PMW circuitry may comprise a PWM circuitry driving transistor having a double gate structure, and the on/off timing of the PWM circuitry driving transistor (T5) may be determined through comparison of the PWM data voltage ($V_{data\_PWM}$) and sweep voltage ($V_{sweep}$), and the CCG circuitry may comprise a CCG circuitry driving transistor (T1) controlling time provided to the micro LED based on the PWM data voltage.

According to one example, the PWM circuitry may further comprise a total of 4 PWM circuitry switching transistors and 1 capacitor, and the CCG circuitry may further comprise a total of 3 switching transistors and 2 capacitors.

According to one example, one of the switching transistors of the CCG circuitry may be a switching transistor (T3) directly connected to the micro LED to prevent a current from flowing into the micro LED before operation of the driving circuit.

According to one example, the PWM circuitry and CCG circuitry may each comprise a plurality of switching TFTs.

According to one example, the driving voltage (VDD) may be connected only to the CCG circuitry and supplied to the driving circuit, without a line connected to the PWM circuitry.

According to one example, a line in which the CCG data voltage ($V_{data\_CCG}$) is branched and supplied to the PWM circuitry and the CCG circuitry, respectively, may be comprised.

According to one example, the driving circuit may operate by being divided in a total of 5 steps of; a first step in which a current of the micro LED is blocked; a second step in which PWM data application and compensation are performed; a third step in which compensation in the CCG circuitry is achieved after PWM data application to the PWM circuitry and CCG circuitry is completed; a fourth step in which the CCG data voltage is applied to the CCG circuitry and capacitive coupling is caused by at least two capacitors; and a fifth step in which the micro LED emits light while a current flows to the CCG circuitry driving transistor (T1).

According to one example, the switching transistor (T3) directly connected to the micro LED may be turned off to block the current of the micro LED in the first step, and the voltage may be stored in the capacitor connected to the two data voltages as the CCG data voltage and PWM data voltage may be applied to the PWM circuitry in the second step.

According to one example, the voltage may increase slowly as a $V_{sweep}$ signal in a triangle wave form is applied, and as the driving transistor of the PWM circuit is turned on, a first capacitor (C1) comprised in the CCG circuit may be discharged and light emission of the micro LED can be stopped, in the fifth step.

FIG. 11, is a schematic diagram showing one example of the pixel structure of the micro LED display device equipped with a driving circuit comprising a double gate transistor according to one example of the present invention.

FIG. 12, is a block diagram showing the configuration of the micro LED display device equipped with a driving circuit comprising a double gate transistor according to one example of the present invention.

Hereinafter, referring to FIG. 11 and FIG. 12 above, the micro LED driving circuit comprising a double gate transistor suggested in one example of the present invention will be described.

The micro LED display device comprising a double gate transistor according to other example of the present invention, in the display device comprising a micro LED driving circuit, may comprise a display panel comprising a pixel array in which pixels composed of a plurality of inorganic light emitting elements are arranged in a plurality of row lines, and a subpixel circuit which is prepared for each of the plurality of inorganic light emitting elements, and provides a driving current to the inorganic light emitting elements; and a driver which sets an image data voltage to the subpixel circuits of the display panel in row line order, during the data setting period, and drives the subpixel circuits so that the driving current is provided to the inorganic light emitting elements of the pixel array in row line order, based on a sweep signal ($V_{sweep}$) which sweeps from a first voltage to a second voltage and the set image data voltage, during the light emission period, and the subpixel circuits, may comprise a PWM circuitry controlling light emitting time of a micro LED; and a CCG circuitry controlling a constant current to flow during light emission of the micro LED.

According to one example, the subpixel circuit may comprise the micro LED driving circuit according to one example of the present invention.

The above description is illustratively describing the technical spirit of the present invention only, and those skilled in the art to which the present invention belongs can make various modification and variation in a range without departing from essential characteristics of the present invention. Therefore, the examples disclosed in the present invention are not intended to limit the technical spirit of the present invention, but are intended to describe it, and the scope of the technical spirit of the present invention is not limited. The scope of the present invention should be construed according to the claims below, and all the technical spirits within the equivalent range thereto should be construed as being included in the scope of the present invention.

The invention claimed is:

1. A micro LED driving circuit comprising a double gate transistor, comprising a PWM circuitry adjusting light emitting time of a micro LED, the PWM circuitry comprising a PWM circuitry driving transistor having a double gate structure, wherein the double gate transistor compensates for threshold voltage shift of the driving TFT while determining an on/off timing through comparison of a PWM data voltage and a sweep voltage ($V_{sweep}$);

wherein the PWM circuitry further comprises a capacitor (C3) and a switching transistor T9), and wherein, in a second step, the PWM data voltage is applied through the switching transistor (T9) and a voltage stored in the capacitor (C3) is Vref_PWM−Vth_T5−Vdata_PWM; and a CCG circuitry controlling a constant current to be supplied during light emission of the micro LED based on the PWM data voltage, wherein the CCG circuitry further comprises at least two capacitors arranged to provide capacitive coupling, the at least two capacitors comprising a first capacitor (C1) and a second capacitor (C2), and wherein a driving voltage (VDD) is connected only to the CCG circuitry without a line connected to the PWM circuitry, and wherein, in a light emission step, when the PWM circuitry driving transistor is turned on by the comparison of the PWM data voltage and the sweep voltage (Vsweep), the first capacitor (C1) comprised in the CCG circuitry is discharged so that light emission of the micro LED is stopped.

2. The micro LED driving circuit comprising a double gate transistor according to claim 1, wherein the PWM circuitry further comprises a total of four switching transistors and one capacitor, and the CCG circuitry further comprises a total of three switching transistors and two capacitors, wherein the one capacitor is the capacitor (C3), and the two capacitors are the first capacitor (C1) and the second capacitor (C2).

3. The micro LED driving circuit comprising a double gate transistor according to claim 2, wherein one of the switching transistors of the CCG circuitry is a switching transistor directly connected to the micro LED to prevent a current from flowing into the micro LED before operation of the driving circuit, and wherein, in a first step, the switching transistor directly connected to the micro LED is turned off to block the current of the micro LED.

4. The micro LED driving circuit comprising a double gate transistor according to claim 1, wherein the PWM circuitry and CCG circuitry each comprise a plurality of switching TFTs.

5. The micro LED driving circuit comprising a double gate transistor according to claim 1, comprising a line in which the CCG data voltage is branched and supplied to the PWM circuitry and the CCG circuitry, respectively.

6. The micro LED driving circuit comprising a double gate transistor according to claim 1, wherein the driving circuit operates in a total of 5 steps:

a first step in which a current of the micro LED is blocked;

a second step in which PWM data application and compensation are performed;

a third step in which compensation in the CCG circuitry is achieved after PWM data application to the PWM circuitry and CCG circuitry is completed;

a fourth step in which a CCG data voltage is applied to the CCG circuitry and capacitive coupling is caused by at least two capacitors; and a fifth step in which the micro LED emits light while a current flows to the CCG circuitry driving transistor, wherein the second step includes applying the PWM data voltage through the switching transistor (T9), the fourth step includes capacitive coupling by the first capacitor (C1) and the second capacitor (C2), and the fifth step includes discharging the first capacitor (C1) when the double gate transistor is turned on.

7. The micro LED driving circuit comprising a double gate transistor according to claim 6, wherein in the first step, a switching transistor directly connected to the micro LED is turned off to block the current of the micro LED, and in the second step, a voltage is stored in a capacitor connected to the two data voltages as a CCG data voltage and a PWM data voltage are applied to the PWM circuitry, wherein the capacitor is the capacitor (C3), and the PWM data voltage is applied through the switching transistor (T9).

8. The micro LED driving circuit comprising a double gate transistor according to claim 6, wherein in the fifth step, a voltage increases slowly as a $V_{sweep}$ signal in a triangle wave form is applied, and as the driving transistor of the PWM circuitry is turned on, a first capacitor comprised in the CCG circuitry is discharged and light emission of the micro LED can be stopped, wherein the driving condition of the double gate transistor is Vsweep>Vref_PWM−Vdata_PWM.

9. A display device comprising a driving circuit of a micro LED, comprising a display panel comprising a pixel array in which pixels composed of a plurality of inorganic light emitting elements are arranged in a plurality of row lines, and subpixel circuits which are prepared for each of the plurality of inorganic light emitting elements, and provide a driving current to the inorganic light emitting elements; and a driver which sets an image data voltage to the subpixel circuits of the display panel in row line order, during a data setting period, and drives the subpixel circuits so that the driving current is provided to the inorganic light emitting elements of the pixel array in row line order, based on a sweep signal ($V_{sweep}$) which sweeps from a first voltage to a second voltage and a set image data voltage, during a light emission period, wherein the subpixel circuits, comprise a PWM circuitry controlling light emitting time of a micro LED; and a CCG circuitry controlling a constant current to flow during light emission of the micro LED, wherein the PWM circuitry comprises a PWM circuitry driving transistor having a double gate structure, a capacitor (C3), and a switching transistor (T9) through which a PWM data voltage is applied to the capacitor (C3), and wherein the CCG circuitry comprises a first capacitor (C1) and a second capacitor (C2) providing capacitive coupling, such that, when Vsweep exceeds Vref_PWM−Vdata_PWM, the double gate transistor is turned on and the first capacitor (C1) is discharged to stop light emission of the micro LED.

* * * * *